US008688381B2

(12) United States Patent
Routh et al.

(10) Patent No.: US 8,688,381 B2
(45) Date of Patent: Apr. 1, 2014

(54) SIMULTANEOUS SOURCE INVERSION FOR MARINE STREAMER DATA WITH CROSS-CORRELATION OBJECTIVE FUNCTION

(75) Inventors: Partha S. Routh, Katy, TX (US);
Jerome R. Krebs, Houston, TX (US);
Spyridon Lazaratos, Houston, TX (US);
Anatoly Baumstein, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 403 days.

(21) Appl. No.: 13/224,005

(22) Filed: Sep. 1, 2011

(65) Prior Publication Data

US 2012/0143506 A1 Jun. 7, 2012

Related U.S. Application Data

(60) Provisional application No. 61/418,694, filed on Dec. 1, 2010, provisional application No. 61/509,904, filed on Jul. 20, 2011.

(51) Int. Cl.
*G06F 19/00* (2011.01)

(52) U.S. Cl.
CPC ..................... *G06F 19/00* (2013.01)
USPC .......................................................... 702/2

(58) Field of Classification Search
USPC ................. 702/2, 3, 150, 182–185
See application file for complete search history.

(56) References Cited

U.S. PATENT DOCUMENTS

| | | | |
|---|---|---|---|
| 3,812,457 A | 5/1974 | Weller | |
| 3,864,667 A | 2/1975 | Bahjat | |
| 4,159,463 A | 6/1979 | Silverman | |
| 4,168,485 A | 9/1979 | Payton et al. | |
| 4,545,039 A | 10/1985 | Savit | |
| 4,562,540 A | 12/1985 | Devaney | |
| 4,575,830 A | 3/1986 | Ingram et al. | |
| 4,594,662 A | 6/1986 | Devaney | |
| 4,636,956 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,828 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |

(Continued)

FOREIGN PATENT DOCUMENTS

| | | |
|---|---|---|
| EP | 1 094 338 | 4/2001 |
| EP | 1 746 443 | 1/2007 |

(Continued)

OTHER PUBLICATIONS

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.
Dickens, T.A. et al. (2011), RTM angle gathers using Poynting vectors, *SEG Expanded Abstracts* 30, pp. 3109-3113.
Helbig, K. (1994), "Foundations of Anisotropy for Exploration Seismics," Chapter 5, pp. 185-194.
Hu, L.Z. et al. (1987), "Wave-field transformations of vertical seismic profiles," *Geophysics* 52, pp. 307-321.
Lazaratos, S. et al. (2011), "Improving the convergence rate of full wavefield inversion using spectral shaping," *SEG Expanded Abstracts* 30, pp. 2428-2432.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Mora, P. (1987), "Elastic Wavefield Inversion," PhD Thesis, Stanford University, pp. 22-25.

(Continued)

*Primary Examiner* — Edward Raymond
(74) *Attorney, Agent, or Firm* — ExxonMobil Upstream Research Company (57) ABSTRACT

Method for simultaneous full-wavefield inversion of gathers of source (or receiver) encoded (30) geophysical data (80) to determine a physical properties model (20) for a subsurface region, especially suitable for surveys where fixed-receiver geometry conditions were not satisfied in the data acquisition (40). The inversion involves optimization of a cross-correlation objective function (100).

27 Claims, 4 Drawing Sheets

(56) References Cited

U.S. PATENT DOCUMENTS

| | | |
|---|---|---|
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2006/0235666 A1 | 10/2006 | Assa et al. |
| 2007/0036030 A1 | 2/2007 | Baumel et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212909 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2012/0095690 A1* | 4/2012 | Higginbotham et al. ....... 702/18 |

FOREIGN PATENT DOCUMENTS

| | | |
|---|---|---|
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Mora, P. (1989), "Inversion=migration+tomography," *Geophysics* 64, pp. 888-901.

Pratt, R.G. (1999), "Seismic waveform inversion in the frequency domain, Part 1: Theory and verification in a physical scale model," *Geophysics* 64, pp. 888-901.

Sheng, J. et al. (2006), "Early arrival waveform tomography on near-surface refraction data," *Geophysics* 71, pp. U47-U57.

Simard, P.Y. et al. (1990), "Vector Field Restoration by the Method of Convex Projections," *Computer Vision, Graphics and Image Processing* 52, pp. 360-385.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Tsvankin, I. (2001), "Seismic Signatures and Analysis of Reflection Data in Anisotropic Media," Elsevier Science, p. 8.

Xie, X. et al. (2002), "Extracting angle domain information from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yoon, K. et al. (2004), "Challenges in reverse-time migration," *SEG Expanded Abstracts* 23, pp. 1057-1060.

Dai, W. et al. (2010), "3D Multi-source Least-squares Reverse Time Migration," SEG Denver 2010 Annual Meeting, pp. 3120-3124.

Delprat-Jannaud, F. et al. (2005), "A fundamental limitation for the reconstruction of impedance profiles from seismic data," *Geophysics* 70(1), pp. R1-R14.

Dunkin, J.W. et al. (1973), "Effect of Normal Moveout on a Seismic Pluse," *Geophysics* 38(4), pp. 635-642.

Igel, H. et al. (1996), "Waveform inversion of marine reflection seismograms for P impedance and Poisson's ratio," *Geophys. J. Int.* 124i, pp. 363-371.

Lancaster, S. et al. (2000), "Fast-track 'colored' inversion," 70th SEG Ann. Meeting, *Expanded Abstracts*, pp. 1572-1575.

(56) References Cited

OTHER PUBLICATIONS

Lazaratos, S. et al. (2009), "Inversion of Pre-migration Spectral Shaping," *2009 SEG Houston Int'l. Expo. & Ann. Meeting, Expanded Abstracts*, pp. 2383-2387.

Lazaratos, S. (2006), "Spectral Shaping Inversion for Elastic and Rock Property Estimation," *Research Disclosure*, Issue 511, pp. 1453-1459.

Moghaddam, P.P. et al. (2010), "Randomized full-waveform inversion: a dimenstionality-reduction approach," $80^{th}$ *SEG Ann. Meeting, Expanded Abstracts*, pp. 977-982.

Ostmo, S. et al. (2002), "Finite-difference iterative migration by linearized waveform inversion in the frequency domain," *SEG Int'l. Expo. & $72^{nd}$ Ann. Meeting*, 4 pgs.

Pica, A. et al. (2005), "3D Surface-Related Multiple Modeling, Principles and Results," *2005 SEG Ann. Meeting, SEG Expanded Abstracts* 24, pp. 2080-2083.

Rawlinson, N. et al. (2008), "A dynamic objective function technique for generating multiple solution models in seismic tomography," *Geophys. J. Int.* 178, pp. 295-308.

Routh, P. et al. (2011), "Encoded Simultaneous Source Full-Wavefield Inversion for Spectrally Shaped Marine Streamer Data," *SEG San Antonio 2011 Ann. Meeting*, pp. 2433-2438.

Shen, P. et al. (2003), "Differential semblance velocity analysis by wave-equation migration," $73^{rd}$ *Ann. Meeting of Society of Exploration Geophysicists*, 4 pgs.

Shih, R-C. et al. (1996), "Iterative pre-stack depth migration with velocity analysis," *Terrestrial, Atmospheric & Oceanic Sciences* 7(2), pp. 149-158.

van Groenestijn, G.J.A. et al. (2009), "Estimating primaries by sparse inversion and application to near-offset reconstruction," *Geophyhsics* 74(3), pp. A23-A28.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Wang, Y. (2007), "Multiple prediction through inversion: Theoretical advancements and real data application," *Geophysics* 72(2), pp. V33-V39.

Wang, K. et al. (2009), "Simultaneous full-waveform inversion for source wavelet and earth model," *SEG Int'l. Expo. & Ann. Meeting, Expanded Abstracts*, pp. 2537-2541.

Wu R-S. et al. (2006), "Directional illumination analysis using beamlet decomposition and propagation," *Geophysics* 71(4), pp. S147-S159.

Young, J. et al. (2011), "An Application of Random Projection to Parameter Estimation in partial Differential Equations," *SIAM*, 20 pgs.

Abt, D.L. et al. (2010), "North American lithospheric discontinuity structured imaged by Ps and Sp receiver functions," *J. Geophys. Res.*, 24 pgs.

Akerberg, P., et al. (2008), "Simultaneous source separation by sparse radon transform," *78th Annual International Meeting, SEG Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Beasley, C. (2008), "A new look at marine simultaneous sources," *The Leading Edge* 27(7), pp. 914-917.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," *SEG Int'l. Exposition and 72th Annl. Mtg.*, 4 pgs.

Berkhout, A.J. (1987), "Applied Seismic Wave Theory," Elsevier Science Publishers, p. 142.

Berkhout, A.J. (1992), "Areal shot record technology," *J. of Seismic Exploration* 1, pp. 251-264.

Berkhout, a.J. (2008), "Changing the mindset in seismic data acquisition," *The Leading Edge* 27(7), pp. 924-938.

Ben-Hadj-Ali, H. et al. (2009), "Three-dimensional frequency-domain full waveform inversion with phase encoding," *SEG Expanded Abstracts*, pp. 2288-2292.

Beylkin, G. (1985), "Imaging of discontinuities in the inverse scattring problem by inversion of a causal generalized Radon transform," *J. Math. Phys.* 26, pp. 99-108.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), "3D Multisource Full-Waveform Inversion Using Dynamic Random Phase Encoding," *SEG Expanded Abstracts* 29, pp. 1044-1049.

Boonyasirwat, C. et al. (2010), "3D Multi-source Least-squares reverse Time Migration," *SEG Denver 2010 Annual Meeting*, pp. 3120-3124.

Bunks, C., et al. (1995), "Multiscale seismic waveform inversion," *Geophysics* 60, pp. 1457-1473.

Chavent, G. et al. (1999), "An optimal true-amplitude least-squares prestack depth-migration operator," *Geophysics* 64(2), pp. 508-515.

Clapp, R.G. (2009), "Reverse time migration with random boundaries," *SEG International Exposition and Meeting, Expanded Abstracts*, pp. 2809-2813.

Dziewonski A. et al. (1981), "Preliminary Reference Earth Model," *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles," *Geophysics* 55(1), pp. 39-50.

Fallat, M.R. et al. (1999), "Geoacoustic inversion via local, global, and hybrid algorithms," *J. Acoust. So. Am.* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

Gibson, B. et al. (1984), "Predictive deconvolution and the zero-phase source," *Geophysics* 49(4), pp. 379-397.

Griewank, A. (1992), "Achieving logarithmic growth of temporal and spatial complexity in reverse automatic differentiation," 1 *Optimization Methods and Software*, pp. 35-54.

Griewank, A. (2000), "Evaluating Derivatives: Principles and Techniques of Algorithmic Differentiation," Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf, 20 pgs.

Herrmann, F.J. (2010), "Randomized dimensionality reduction for full-waveform inversion," *EAGE abstract* G001, $72^{nd}$ EAGE Barcelona meeting, 5 pgs.

Holschneider, J. et al. (2005), "Characterization of dispersive surface waves using continuous wavelet transforms," *Geophys. J. Int.* 163, pp. 463-478.

Ikelle, L.T. (2007), "Coding and decoding: Seismic data modeling, acquisition, and processing," *77th Annual Int'l. Meeting, SEG Expanded Abstracts*, pp. 66-70.

Jackson, D.R. et al. (1991), "Phase conjugation in underwater acoustics," *J. Acoust. Soc. Am.* 89(1), pp. 171-181.

(56) References Cited

OTHER PUBLICATIONS

Jing, X. et al. (2000), "Encoding multiple shot gathers in prestack migration," *SEG International Exposition and 70th Annual Meeting, Expanded Abstracts*, pp. 786-789.

Kennett, B.L.N. (1991), "The removal of free surface interactions from three-component seismograms," *Geophys. J. Int.* 104, pp. 153-163.

Krebs, J.R. (2008), "Full-wavefield seismic inversion using encoded sources," *Geophysics* 74(6), pp. WCC177-WCC188.

Krohn, C.E. (1984), "Geophone ground coupling," *Geophysics* 49(6), pp. 722-731.

Kroode, F.T. et al. (2009), "Wave Equation Based Model Building and Imaging in Complex Settings," OTC 20215, 2009 Offshore Technology Conf., Houston, TX, May 4-7, 2009, 8 pgs.

Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.

Lecomte, I. (2008), "Resolution and illumination analyses in PSDM: A ray-based approach," *The Leading Edge*, pp. 650-663.

Levanon, N. (1988), "Radar Principles, Chpt. 1—Radar Measurements," John Whiley & Sons, New York, pp. 1-18.

Liao, Q. et al. (1995), "2.5D full-wavefield viscoacoustic inversion," *Geophysical Prospecting* 43, pp. 1043-1059.

Maharramov, M. et al. (2007) , "Localized image-difference wave-equation tomography," *SEG Annual Meeting, Expanded Abstracts*, pp. 3009-3013.

Marcinkovich, C. et al. (2003), "On the implementation of perfectly matched layers in a three-dimensional fourth-order velocity-stress finite difference scheme," *J. of Geophysical Research* 108(B5), pp. 18-1-18-16.

Meier, M.A. et al. (2009), "Converted wave resolution," *Geophysics* 74(2), pp. Q1-Q16.

Mora, P. (1987), "Nonlinear two-dimensional elastic inversion of multi-offset seismic data," *Geophysics* 52, pp. 1211-1228.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Rayleigh, J.W.S. (1899), "On the transmission of light through an atmosphere containing small particles in suspension, and on the origin of the blue of the sky," *Phil. Mag.* 47. pp. 375-384.

Romero, L.A. et al. (2000), "Phase encoding of shot records in prestack migration," *Geophysics* 65, pp. 426-436.

Ryden, N. et al. (2006), "Fast simulated annealing inversion of surface waves on pavement using phase-velocity spectra," *Geophysics* 71(4), pp. R49-R58.

Schuster, G.T. (2010), "Theory of Multisource Crosstalk Reduction by Phase-Encoded Statics," SEG Denver 2010 Annual Meeting, pp. 3110-3114.

Sheriff, R.E. et al. (1982), "Exploration Seismology," pp. 134-135.

Shin, C. et al. (2001), "Waveform inversion using a logarithmic wavefield," *Geophysics* 49, pp. 592-606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. SM213-SM221.

Tarantola, A. (1984), "Inversion of seismic reflection data in the acoustic approximation," *Geophysics* 49, pp. 1259-1266.

Tarantola, A. (1988), "Theoretical background for the inversion of seismic waveforms, including elasticity and attenuation," *Pure and Applied Geophysics* 128, pp. 365-399.

Trantham, E.C. (1994), "Controlled-phase acquisition and processing," *SEG Expanded Abstracts* 13, pp. 890-894.

van Manen, D.J. (2005), "Making wave by time reversal," *SEG International Exposition and 75th Annual Meeting, Expanded Abstracts*, pp. 1763-1766.

Verschuur, D.J. (2009), "Target-oriented, least-squares imaging of blended data," 79th Annual Int'l. Meeting, *SEG Expanded Abstracts*, pp. 2889-2893.

Vigh, D. et al. (2008), "3D prestack plane-wave, full-waveform inversion," *Geophysics* 73(5), pp. VE135-VE144.

Weglein, A.B. (2003), "Inverse scattering series and seismic exploration," *Inverse Problems* 19, pp. R27-R83.

Xia, J. et al. (2004), "Utilization of high-frequency Rayleigh waves in near-surface geophysics," *The Leading Edge*, pp. 753-759.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Baumstein, A. et al. (2009), "Scaling of the Objective Function Gradient for Full Wavefield Inversion," SEG Houston 2009 Int'l. Expo. & Annual Meeting, pp. 2243-2247.

Burstedde, C. et al. (2009), "Algorithmic strategies for full waveform inversion: 1D experiments," *Geophysics* 74(6), pp. WCC37-WCC46.

Lee, S. et al. (2010), "Subsurface parameter estimation in full wavefield inversion and reverse time migration," SEG Denver 2010 Annual Meeting, pp. 1065-1069.

Malmedy, W. et al. (2009), "Approximating Hessians in unconstrained optimization arising from discretized problems," *Computational Optimization and Applications*, pp. 1-16.

Martin, G.S. et al. (2006), "Marmousi2: An elastic upgrade for Marmousi," *The Leading Edge*, pp. 156-166.

Nocedal, J. et al. (2006), "*Numerical Optimization, Chapt. 7—Large-Scale Unconstrained Optimization*," Springer, New York, 2nd Edition, pp. 165-176.

Sheen, D-H. et al. (2006), "Time domain Gauss-Newton seismic waveform inversion in elastic media," *Geophysics J. Int.* 167, pp. 1373-1384.

Tarantola, A. (1986), "A strategy for nonlinear elastic inversion of seismic reflection data," *Geophysics* 51(10), pp. 1893-1903.

Tarantola, A. (2005), "Inverse Problem Theory and Methods for Model Parameter Estimation," *SIAM*, p. 79.

\* cited by examiner

SIMULTANEOUS SOURCE INVERSION FOR MARINE STREAMER DATA WITH CROSS-CORRELATION OBJECTIVE FUNCTION

CROSS-REFERENCE TO RELATED APPLICATION

This application claims the benefit of U.S. Provisional Patent Application 61/418,694, filed Dec. 1, 2010, entitled Simultaneous Source Inversion for Marine Streamer Data with Cross-Correlation Objective Function, and U.S. Provisional Patent Application 61/509,904, filed Jul. 20, 2011 having the same title, both of which are incorporated by reference herein in their entirety.

FIELD OF THE INVENTION

The invention relates generally to the field of geophysical prospecting, and more particularly to geophysical data processing. Specifically, the invention is a method for inversion of data acquired from multiple geophysical sources such as seismic sources, involving geophysical simulation that computes the data from many simultaneously-active geophysical sources in one execution of the simulation.

BACKGROUND OF THE INVENTION

Even with modern computing power, seismic full wavefield inversion is still a computationally expensive endeavor. However, the benefit of obtaining a detailed representation of the subsurface using this method is expected to outweigh this impediment. Development of algorithms and workflows that lead to faster turn around time is a key step towards making this technology feasible for field scale data. Seismic full waveform inversion involves several iterations of forward and adjoint simulation of the data. Therefore techniques that reduce the cost of forward and adjoint computation runs will allow users to solve larger scale problems in a reasonable amount of time.

Geophysical inversion [1,2] attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

Iterative inversion is generally preferred over non-iterative inversion, because it yields more accurate subsurface parameter models. Unfortunately, iterative inversion is so computationally expensive that it is impractical to apply it to many problems of interest. This high computational expense is the result of the fact that all inversion techniques require many compute intensive simulations. The compute time of any individual simulation is proportional to the number of sources to be inverted, and typically there are large numbers of sources in geophysical data, where the term source as used in the preceding refers to an activation location of a source apparatus. The problem is exacerbated for iterative inversion, because the number of simulations that must be computed is proportional to the number of iterations in the inversion, and the number of iterations required is typically on the order of hundreds to thousands.

The most commonly employed iterative inversion method employed in geophysics is cost function optimization. Cost function optimization involves iterative minimization or maximization of the value, with respect to the model M, of a cost function S(M) which is a measure of the misfit between the calculated and observed data (this is also sometimes referred to as the objective function), where the calculated data are simulated with a computer using the current geophysical properties model and the physics governing propagation of the source signal in a medium represented by a given geophysical properties model. The simulation computations may be done by any of several numerical methods including but not limited to finite difference, finite element or ray tracing. The simulation computations can be performed in either the frequency or time domain.

Cost function optimization methods are either local or global [3]. Global methods simply involve computing the cost function S(M) for a population of models $\{M_1, M_2, M_3, \ldots\}$ and selecting a set of one or more models from that population that approximately minimize S(M). If further improvement is desired this new selected set of models can then be used as a basis to generate a new population of models that can be again tested relative to the cost function S(M). For global methods each model in the test population can be considered to be an iteration, or at a higher level each set of populations tested can be considered an iteration. Well known global inversion methods include Monte Carlo, simulated annealing, genetic and evolution algorithms.

Unfortunately global optimization methods typically converge extremely slowly and therefore most geophysical inversions are based on local cost function optimization. Algorithm 1 summarizes local cost function optimization.

---

Algorithm 1 - Algorithm for performing local cost function optimization.

1. selecting a starting model,
2. computing the gradient of the cost function S(M) with respect to the parameters that describe the model,
3. searching for an updated model that is a perturbation of the starting model in the negative gradient direction that better explains the observed data.

---

This procedure is iterated by using the new updated model as the starting model for another gradient search. The process continues until an updated model is found that satisfactorily explains the observed data. Commonly used local cost function inversion methods include gradient search, conjugate gradients and Newton's method.

Local cost function optimization of seismic data in the acoustic approximation is a common geophysical inversion task, and is generally illustrative of other types of geophysical inversion. When inverting seismic data in the acoustic approximation the cost function can be written as:

$$S(M) = \sum_{g=1}^{N_g} \sum_{r=1}^{N_r} \sum_{t=1}^{N_t} W(\psi_{calc}(M, r, t, w_g) - \psi_{obs}(r, t, w_g)) \quad \text{(Eqn. 1)}$$

where:
S=cost function,
M=vector of N parameters, $(m_1, m_2, \ldots m_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=minimization criteria function (we usually choose $W(x) = x^2$ which is the least squares (L2) criteria),
$\psi_{calc}$=calculated seismic pressure data from the model M,
$\psi_{obs}$=measured seismic pressure data.

The gathers can be any type of gather that can be simulated in one run of a seismic forward modeling program. Usually the gathers correspond to a seismic shot, although the shots can be more general than point sources. For point sources the gather index g corresponds to the location of individual point sources. For plane wave sources g would correspond to different plane wave propagation directions. This generalized source data, $\psi_{obs}$, can either be acquired in the field or can be synthesized from data acquired using point sources. The calculated data $\psi_{calc}$ on the other hand can usually be computed directly by using a generalized source function when forward modeling. For many types of forward modeling, including finite difference modeling, the computation time needed for a generalized source is roughly equal to the computation time needed for a point source.

Equation (1) can be simplified to:

$$S(M) = \sum_{g=1}^{N_g} W(\delta(M, w_g)). \quad \text{(Eqn. 2)}$$

where the sum over receivers and time samples is now implied and, $$\delta(M, w_g) = \psi_{calc}(M, w_g) - \psi_{obs}(w_g) \quad \text{(Eqn. 3)}$$

Inversion attempts to update the model M such that S(M) is a minimum. This can be accomplished by local cost function optimization which updates the given model $M^{(k)}$ as follows:

$$M^{(k+1)} = M^{(k)} - \alpha^{(k)} \nabla_M S(M) \quad \text{(Eqn. 4)}$$

where k is the iteration number, $\alpha$ is the scalar size of the model update, and $\nabla_M S(M)$ is the gradient of the misfit function, taken with respect to the model parameters. The model perturbations, or the values by which the model is updated, are calculated by multiplication of the gradient of the objective function with a step length $\alpha$, which must be repeatedly calculated.

From equation (2), the following equation can be derived for the gradient of the cost function:

$$\nabla_M S(M) = \sum_{g=1}^{N_g} \nabla_M W(\delta(M, w_g)). \quad \text{(Eqn. 5)}$$

So to compute the gradient of the cost function one must separately compute the gradient of each gather's contribution to the cost function, then sum those contributions. Therefore, the computational effort required for computing $\nabla_M S(M)$ is $N_g$ times the compute effort required to determine the contribution of a single gather to the gradient. For geophysical problems, $N_g$ usually corresponds to the number of geophysical sources and is on the order of 10,000 to 100,000, greatly magnifying the cost of computing $\nabla_M S(M)$.

Note that computation of $\nabla_M W(\delta)$ requires computation of the derivative of $W(\delta)$ with respect to each of the N model parameters $m_i$. Since for geophysical problems N is usually very large (usually more that one million), this computation can be extremely time consuming if it had to be performed for each individual model parameter. Fortunately, the adjoint method can be used to efficiently perform this computation for all model parameters at once [1]. The adjoint method for the least squares objective function and a gridded model parameterization is summarized by the following algorithm:

Algorithm 2 - Algorithm for computing the least-squares cost-function gradient of a gridded model using the adjoint method.

1. Compute forward simulation of the data using the current model and the gather signature $w_g$ as the source to get $\psi_{calc}(M^{(k)}, w_g)$,
2. Subtract the observed data from the simulated data giving $\delta(M^{(k)}, w_g)$,
3. Compute the reverse simulation (i.e. backwards in time) using $\delta(M^{(k)}, w_g)$ as the source producing $\psi_{adjoint}(M^{(k)}, w_g)$,
4. Compute the integral over time of the product of $\psi_{calc}(M^{(k)}, w_g)$ and $\psi_{adjoint}(M^{(k)}, w_g)$ to get $\nabla_M W(\delta(M, w_g))$.

While computation of the gradients using the adjoint method is efficient relative to other methods, it is still very costly. In particular the adjoint methods requires two simulations, one forward in time and one backward in time, and for geophysical problems these simulations are usually very compute intensive. Also, as discussed above, this adjoint method computation must be performed for each measured data gather individually, increasing the compute cost by a factor of $N_g$.

The compute cost of all categories of inversion can be reduced by inverting data from combinations of the sources, rather than inverting the sources individually. This may be called simultaneous source inversion. Several types of source combination are known including: coherently sum closely spaced sources to produce an effective source that produces a wavefront of some desired shape (e.g. a plane wave), sum widely spaces sources, or fully or partially stacking the data before inversion.

The compute cost reduction gained by inverting combined sources is at least partly offset by the fact that inversion of the combined data usually produces a less accurate inverted model. This loss in accuracy is due to the fact that information is lost when the individual sources are summed, and therefore the summed data does not constrain the inverted model as strongly as the unsummed data. This loss of information during summation can be minimized by encoding each shot record before summing Encoding before combination preserves significantly more information in the simultaneous source data, and therefore better constrains the inversion [4]. Encoding also allows combination of closely spaced sources, thus allowing more sources to be combined for a given computational region. Various encoding schemes can be used with this technique including time shift encoding and random phase encoding. The remainder of this Background section briefly reviews various published geophysical simultaneous source techniques, both encoded and non-encoded.

Van Manen [6] suggests using the seismic interferometry method to speed up forward simulation. Seismic interferometry works by placing sources everywhere on the boundary of the region of interest. These sources are modeled individually and the wavefield at all locations for which a Green's function is desired is recorded. The Green's function between any two recorded locations can then be computed by cross-correlating the traces acquired at the two recorded locations and summing over all the boundary sources. If the data to be inverted have a large number of sources and receivers that are within the region of interest (as opposed to having one or the other on the boundary), then this is a very efficient method for computing the desired Green's functions. However, for the seismic data case it is rare that both the source and receiver for the data to be inverted are within the region of interest. Therefore, this improvement has very limited applicability to the seismic inversion problem.

Berkhout [7] and Zhang [8] suggest that inversion in general can be improved by inverting non-encoded simultaneous sources that are summed coherently to produce some desired wave front within some region of the subsurface. For example, point source data could be summed with time shifts that are a linear function of the source location to produce a down-going plane wave at some particular angle with respect to the surface. This technique could be applied to all categories of inversion. A problem with this method is that coherent summation of the source gathers necessarily reduces the amount of information in the data. So for example, summation to produce a plane wave removes all the information in the seismic data related to travel time versus source-receiver offset. This information is critical for updating the slowly varying background velocity model, and therefore Berkhout's method is not well constrained. To overcome this problem many different coherent sums of the data (e.g. many plane waves with different propagation directions) could be inverted, but then efficiency is lost since the cost of inversion is proportional to the number of different sums inverted. Herein, such coherently summed sources are called generalized sources. Therefore, a generalized source can either be a point source or a sum of point sources that produces a wave front of some desired shape.

Van Riel [9] suggests inversion by non-encoded stacking or partial stacking (with respect to source-receiver offset) of the input seismic data, then defining a cost function with respect to this stacked data which will be optimized. Thus, this publication suggests improving cost function based inversion using non-encoded simultaneous sources. As was true of the Berkhout's [6] simultaneous source inversion method, the stacking suggested by this method reduces the amount of information in the data to be inverted and therefore the inversion is less well constrained than it would have been with the original data.

Mora [10] proposes inverting data that is the sum of widely spaced sources. Thus, this publication suggests improving the efficiency of inversion using non-encoded simultaneous source simulation. Summing widely spaced sources has the advantage of preserving much more information than the coherent sum proposed by Berkhout. However, summation of widely spaced sources implies that the aperture (model region inverted) that must be used in the inversion must be increased to accommodate all the widely spaced sources. Since the compute time is proportional to the area of this aperture, Mora's method does not produce as much efficiency gain as could be achieved if the summed sources were near each other.

Ober [11] suggests speeding up seismic migration, a special case of non-iterative inversion, by using simultaneous encoded sources. After testing various coding methods, Ober found that the resulting migrated images had significantly reduced signal-to-noise ratio due to the fact that broad band encoding functions are necessarily only approximately orthogonal. Thus, when summing more than 16 shots, the quality of the inversion was not satisfactory. Since non-iterative inversion is not very costly to begin with, and since high signal-to-noise ratio inversion is desired, this technique is not widely practiced in the geophysical industry.

Ikelle [12] suggests a method for fast forward simulation by simultaneously simulating point sources that are activated (in the simulation) at varying time intervals. A method is also discussed for decoding these time-shifted simultaneous-source simulated data back into the separate simulations that would have been obtained from the individual point sources. These decoded data could then be used as part of any conventional inversion procedure. A problem with Ikelle's method is that the proposed decoding method will produce separated data having noise levels proportional to the difference between data from adjacent sources. This noise will become significant for subsurface models that are not laterally constant, for example from models containing dipping reflectors. Furthermore, this noise will grow in proportion to the number of simultaneous sources. Due to these difficulties, Ikelle's simultaneous source approach may result in unacceptable levels of noise if used in inverting a subsurface that is not laterally constant.

Source encoding proposed by Krebs et al. in PCT Patent Application Publication No. WO 2008/042081, which is incorporated herein by reference in all jurisdictions that allow it, is a very cost effective method to invert full wave field data. (The same approach of simultaneous inversion of an encoded gather will work for receivers, either via source-receiver reciprocity or by encoding the actual receiver locations in common-source gathers of data.) For fixed receivers, the forward and adjoint computations only need to be performed for a single effective source; see PCT Patent Application Publication No. WO 2009/117174, which is incorporated herein by reference in all jurisdictions that allow it. Given the fact that hundreds of shots are recorded for typical 2D acquisition geometries, and thousands in the case of 3D surveys, computational savings from this method are quite significant. In practice, a fixed receiver assumption is not strictly valid for most common field data acquisition geometries. In the case of marine streamer data, both sources and receivers move for every new shot. Even in surveys where the locations of receivers are fixed, the practice often is that not all receivers are "listening" to every shot, and the receivers that are listening can vary from shot-to-shot. This also violates the "fixed-receiver assumption." In addition, due to logistical problems, it is difficult to record data close to the source, and this means that near-offset data are typically missing. This is true for both marine and land surveys. Both of these factors mean that for a simultaneous source gather, every receiver location will be missing data for some source shots. In summary, in simultaneous encoded-source inversion, for a given simultaneous encoded gather, data are required at all receiver locations for every shot, and this may be referred to as the fixed-receiver assumption of simultaneous encoded-source inversion. In WO 08/042081, some of the disclosed embodiments may work better than others when the fixed-receiver assumption is not satisfied. Therefore, it would be advantageous to have an accommodation or adjustment to straightforward application of simultaneous encoded sources (and/or receivers) inversion that would enhance its performance when the fixed-receiver assumption is compromised. The present invention provides ways of doing this. Haber et al. [15] also describe an approach to the problem of moving receivers in simultaneous encoded source inversion using a stochastic optimization method, and apply it to a direct current resistivity problem.

SUMMARY OF THE INVENTION

Figure 2:
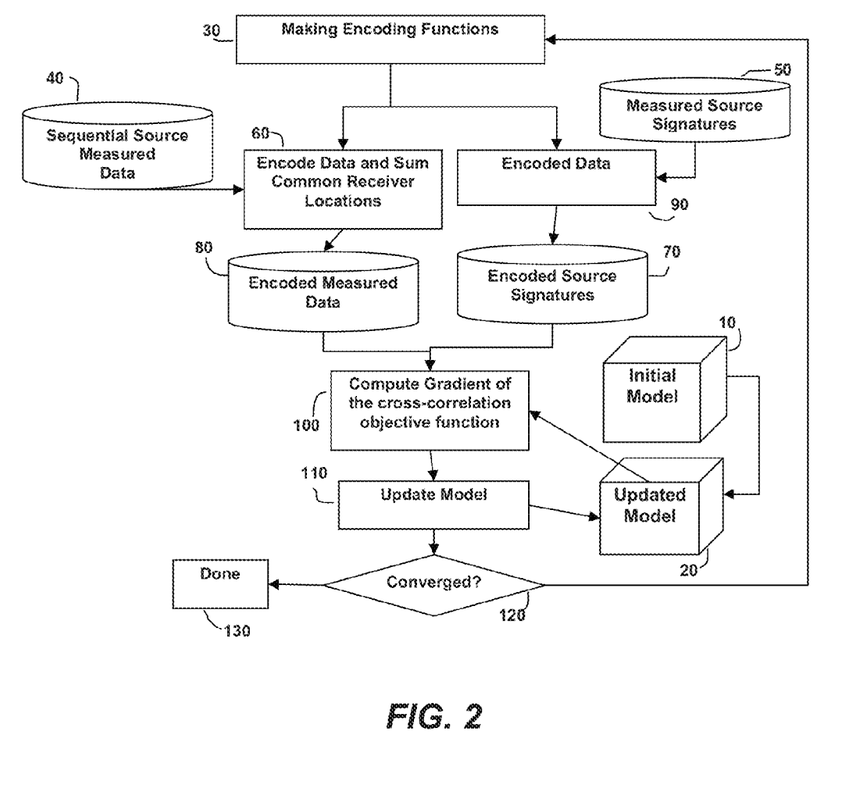
FIG. 2 is a flow chart showing basic steps in one illustrative embodiment of the present inventive method.

In one embodiment, the invention is a computer-implemented method for full-wavefield inversion, using simultaneous source encoding, of measured geophysical data from a survey that does not satisfy the fixed-receiver assumption of simultaneous encoded source inversion, to determine a physical properties model for a subsurface region, comprising the following steps, described with reference to the flowchart of FIG. 2, wherein all summing, simulating, computing, and updating is performed on a computer:

(a) obtaining a group of two or more encoded gathers of the measured geophysical data (40), acquired under conditions where the fixed-receiver assumption is not valid, wherein each gather is associated with a single generalized source, or alternatively with a single receiver, and wherein each gather is encoded (60) with a different encoding function selected from a set of non-equivalent encoding functions (30);

(b) summing the encoded gathers in the group by summing all, or selected, data records in each gather that correspond to a single receiver (60) or alternatively to a single source, and repeating for each different receiver or alternatively for each different source, resulting in a simultaneous encoded gather (80); or alternatively acquiring encoded data in the field survey (90) where the encoding functions are measured source signatures (50);

(c) assuming a physical properties model (10) of the subsurface region, said model providing values of at least one physical property at locations throughout the subsurface region;

(d) simulating a synthetic simultaneous encoded gather of data, using the assumed physical properties model, wherein the simulation uses encoded source signatures (70), and wherein an entire simultaneous encoded gather is simulated in a single simulation operation;

(e) computing an objective function measuring cross-correlation between the simultaneous encoded gather of measured data and the simulated simultaneous encoded gather (100);

(f) updating (110) the physical properties model by optimizing the objective function (100);

(g) iterating steps (a)-(f) at least one more time using the updated physical properties model (20) from the previous iteration as the assumed physical properties model in step (c), resulting in a further updated physical properties model; and (h) after convergence (120), downloading, displaying, or saving the further updated physical properties model to computer storage (130).

BRIEF DESCRIPTION OF THE DRAWINGS

The present invention and its advantages will be better understood by referring to the following detailed description and the attached drawings in which:

FIGS. 1A-C are data of a test example, wherein

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The method proposed in this patent memo uses a cross-correlation objective function to invert encoded simultaneous source data. The raw shot gathers that are encoded to form simultaneous source data have missing near and far-offsets which is typical in a marine streamer survey. An intuitive understanding of how this cross-correlation objective function works for full wave field inversion ("FWI") for non-fixed receiver data can be obtained by considering the imaging problem. In FWI, one or many modes of the seismic wavefields are inverted to obtain a physical property model of the Earth. First consider the imaging problem for simultaneous source reverse time migration ("RTM").

Assume two measured wavefields $d_1$, $d_2$ in the subsurface due to two sources and they are encoded given by, $$d_{fixed}^{encoded} = \alpha_1 P d_1 + \alpha_2 P d_2$$

Where P is the projection operator that projects the data onto all receivers required for fixed receiver geometry. So if the operator P is same for all shots then it is a fixed receiver geometry. The encoded source is given by, $$S = \alpha_1 S_1 + \alpha_2 S_2$$

Let the forward problem be denoted by Ld=S where L is the partial differential operator, d is the simulated response and S is the encoded source function. If we denote the forward operator by $L^{-1}$ such that simulated data $d = L^{-1}S$ and denote the back-propagation operator by $\hat{L}^{-1}$, then the image obtained by cross-correlation is given by, $$\text{Image} = (L^{-1}S) \otimes \left(\hat{L}^{-1} d_{fixed}^{encoded}\right) = $$
$$\sum_{k=1}^{2} \alpha_k^2 (L^{-1}S_k) \otimes \left(\hat{L}^{-1}[Pd_k]\right) + \sum_{i \neq j}^{2} \alpha_i \alpha_j (L^{-1}S_i) \otimes \left(\hat{L}^{-1} Pd_j\right)$$

where P is the projection operator that maps the data computed in the entire domain to the set of fixed receivers. For the case of fixed receivers, P will be same for all sources since each and every receiver is listening to all sources.

For non-fixed receiver geometry, assume that $P_k$ is the projection operator onto subset of receivers for the k-th source. Then the encoded data is given by, $$d_{non\text{-}fixed}^{encoded} = \alpha_1 P_1 d_1 + \alpha_2 P_2 d_2$$

The image is then given by $$\text{Image} = \sum_{k=1}^{2} \alpha_k^2 (L^{-1}S_k) \otimes \left(\hat{L}^{-1}[P_k d_k]\right) + \sum_{i \neq j}^{2} \alpha_i \alpha_j (L^{-1}S_i) \otimes \left(\hat{L}^{-1}[P_j d_j]\right)$$

If several realizations of encoding are used, the second term due to cross-talk cancels and its contribution to the image diminishes, thereby enhancing the signal to noise ratio. There is a close connection between the imaging and generating gradient for FWI. If we consider the objective function (often called cost function) in FWI to be an L2, i.e. least-squares, norm between measured and simulated data, then the gradient of the L2 objective function is simply the cross-correlation of the back-propagated data residual with the simulated wavefield. For fixed receiver geometry this is good measure since a particular receiver is listening to all sources. For non-fixed receivers, this is problematic since the encoded measured data is deficient compared to the encoded simulated data. This deficiency ultimately maps into model artifacts.

However the insight gained from the imaging condition where the receivers are non-fixed may be perceived as a clue that using a cross-correlation objective function for FWI can help mitigate this problem. So instead of L2, we consider a cross-correlation objective function, given by:

$$\phi = \frac{d_{non\text{-}fixed}^{meas} \otimes d_{fixed}^{simulated}}{\|d_{non\text{-}fixed}^{meas}\| \|d_{fixed}^{simulated}\|}$$

where $d_{non\text{-}fixed}^{meas}$ are the encoded measured data with the non-fixed receivers, implying that the traces for which receivers are not listening to the source are assumed to be zero traces. $d_{fixed}^{simulated}$ are the simulated encoded data from the simultaneous source function; this is fixed receiver data since all the sources are fired simultaneously and every receiver is measuring the signal from this simultaneous source. Suppose for each shot, hypothetically, we are able to separate the receivers that are present in the survey and those that are missing, such that one can write $d_{fixed}^{simulated} = d_{non\text{-}fixed}^{simulated} + d_{missing}^{simulated}$.

$$\phi = \frac{\left(d_{non\text{-}fixed}^{simulated} + d_{missing}^{simulated}\right) \otimes d_{non\text{-}fixed}^{meas}}{\|d_{non\text{-}fixed}^{meas}\| \|d_{fixed}^{simulated}\|} =$$

$$\frac{d_{non\text{-}fixed}^{simulated} \otimes d_{non\text{-}fixed}^{meas}}{\|d_{non\text{-}fixed}^{meas}\| \|d_{fixed}^{simulated}\|} + \frac{d_{missing}^{simulated} \otimes d_{non\text{-}fixed}^{meas}}{\|d_{non\text{-}fixed}^{meas}\| \|d_{fixed}^{simulated}\|}$$

The traces that contribute to $d_{missing}^{simulated}$ are exactly the traces that are not available in the measured data i.e., $d_{non\text{-}fixed}^{meas}$. Thus the contribution of the second term is small compared to the first term in the above equation. We can approximate the objective function by, $$\phi \approx \frac{d_{non\text{-}fixed}^{simulated} \otimes d_{non\text{-}fixed}^{meas}}{\|d_{non\text{-}fixed}^{meas}\| \|d_{fixed}^{simulated}\|}$$

Also, if a different encoding is used for some iterations, preferably at each iteration, as taught by Krebs et al. in PCT Patent Application Publication No. WO 2008/042081, the second term will eventually diminish. In addition to changing encoding every iteration, a further option is to use a set of encodings at each iteration designed to obtain an average gradient of the objective function, i.e. the gradients obtained from each of the encodings when summed give the average gradient. Therefore at each iteration this averaging process decreases the cross-talk—an idea that is very similar to simultaneous source RTM imaging where the images obtained with different encodings are stacked to cancel the cross-talk noise. The averaging of the gradient is also advocated in stochastic optimization methods (Haber et al., [15]).

The overall goal in preferred embodiments of the present inventive method is to maximize, not minimize, the cross-correlation objective function. However, one can reformulate the objective function, e.g. replace it by its negative, in such a way that one effectively solves a minimization problem. The general expression of this step in the present inventive method is therefore to optimize the objective function. Depending on the choice of the optimization algorithm, i.e., whether it is solving a maximization or a minimization algorithm, the objective function can be chosen such that it preserves the main characteristics of the cross-correlation property that are insensitive to any arbitrary scale of the data. An advantage of the cross-correlation objective function is it makes the FWI insensitive to the scale of the wavelet. Effectively the travel-time components of the waveform are fit with this objective function. This can be easily seen if the objective function is written in frequency domain where the phase is a function of the travel-time.

Synthetic Example

Figure 1A:
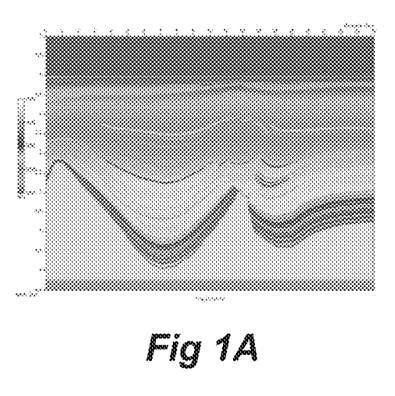
FIG. 1A shows the "true" velocity model for the exercise, i.e. the model used to simulate synthetic survey data.

The feasibility of the present inventive method was demonstrated with a synthetic example using the velocity model shown in FIG. 1A. In the example, 383 shots were generated with 80 m shot spacing and receivers were placed every 20 m. To simulate the non-fixed receiver geometry, for each shot we removed the near and far offsets and used offsets from positive 200 m to 3 km. As intended, the missing receiver data at the near and far offsets violate the fixed-receiver assumption. Those shots were encoded to form the measured encoded data. At each iteration in the nonlinear inversion, we used all the sequential shots in the survey and encode those 8 times using different encoding functions to form 8 simultaneous sources to compute the average gradient. Depending on how much cross-talk is present in the average gradient, one can increase the number of encodings. This is implemented for both the L2 objective function and the cross-correlation objective function.

Figure 1B:
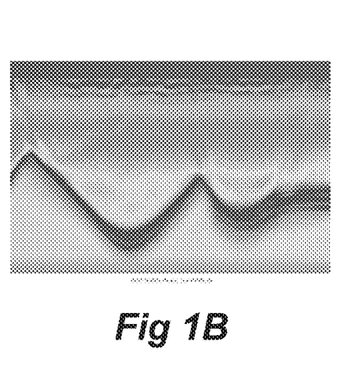
FIG. 1B shows the velocity model obtained by inversion of the simulated survey data using a conventional L2 objective function.
Figure 1C:
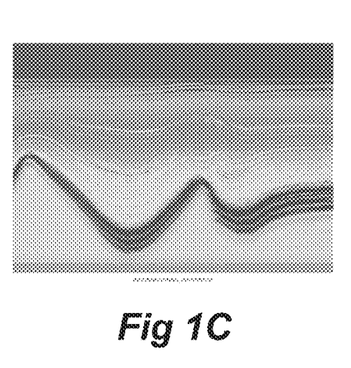
FIG. 1C shows the velocity model obtained by inversion using the cross-correlation objective function of the present inventive method.

The multi-resolution method with time-windowing was used to carry out the inversion. In the multi-resolution method, data are windowed by frequency bands to stabilize the inversion problem. Typically the data at the lower frequency band are inverted first and the model obtained from the low frequency inversion is used as the starting model for the next higher frequency band. This technique is used to avoid converging to a wrong solution often referred as local minima solutions. FIG. 1B shows the model obtained using the L2 objective function. Clearly, artifacts can be seen in both the shallow and deep part of the model. The model in FIG. 1C is the result of using the cross-correlation objective function. The model clearly shows significant improvement compared to the model of FIG. 1B, reinforcing the observation that the cross-correlation measure is much better suited to handle non-fixed receiver geometry simultaneous source data.

Inversion with the cross-correlation objective function may encounter local minima when the source records being added are spaced too closely. Spacing shot records further apart resolves this issue, but reduces the amount of information going into the inversion, thereby degrading the quality of the final inverted model. A way to resolve this conflict is to split all available shots records into several groups, where shot records belonging to the same group are spaced further apart. A different group of shots may then be selected in each iteration of the nonlinear inversion, until all groups have been used. The process may be repeated until convergence. One way that this can be done is with the encoding functions that multiply the source signatures and the measured data gathers. All encoding functions for data records not in the selected group for a particular iteration can be set equal to zero. In fact, the encoding functions may be used to randomly choose the shots in each group, which will result in increased shot spacing following the idea presented by Boonyasiriwat and Schuster, 2010, where they apply this to a fixed-receiver spread and for a different purpose. This can be done using the random encoding sequence [−1,0,+1]. This technique for increasing shot spacing can be used in the present inventive method for reducing crosstalk noise for non-stationary receivers. Other methods for achieving greater shot separation in the smaller groups of shot records may be devised.

The following is an example of applying the strategy described above.

Figure 3:
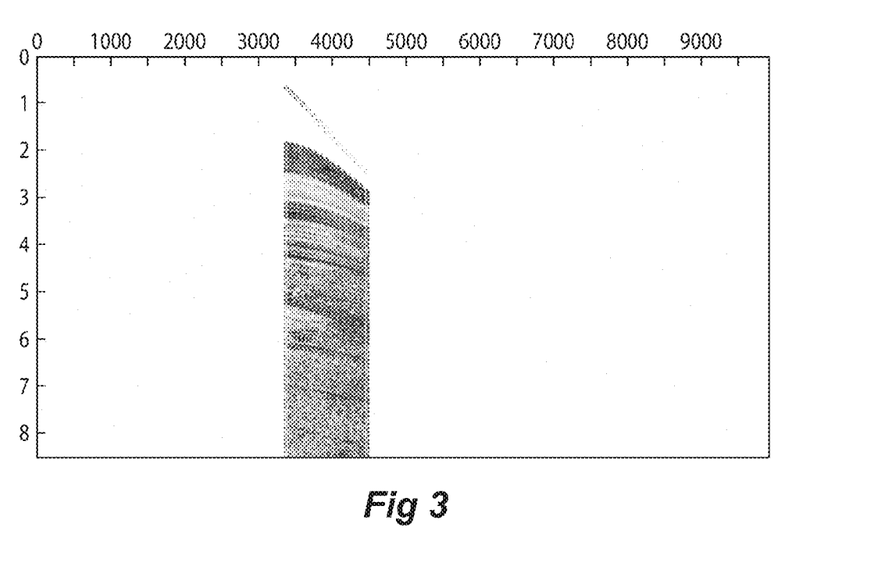
FIG. 3 is a cross-section of simulated seismic data showing the sum of four shots spaced 20 m apart.
Figure 4:
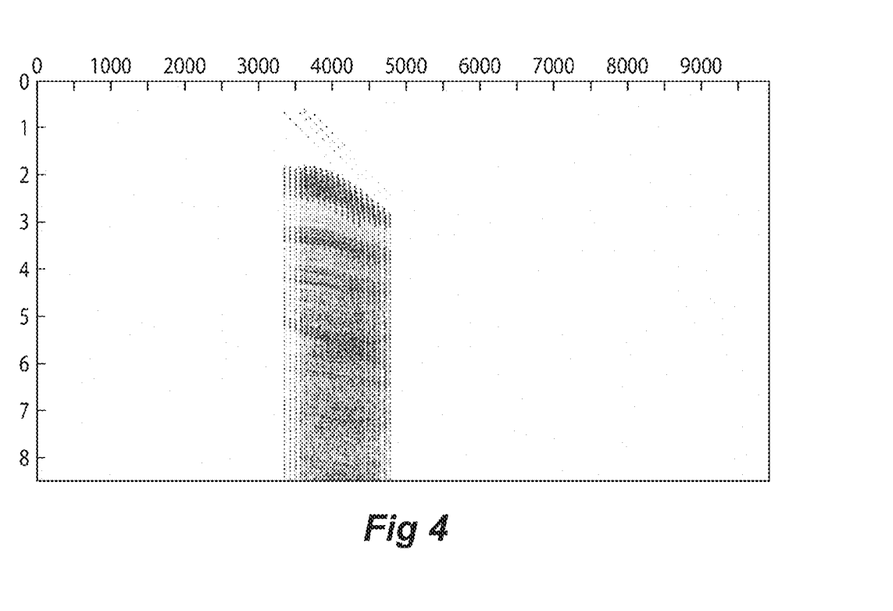
FIG. 4 is a cross-section of simulated seismic data showing the sum of four shots space 100 m apart.
Figure 5A:
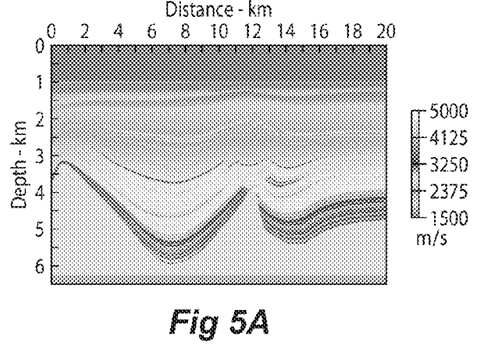
FIGS. 5A-5C display the results of a model study showing the advantages of an embodiment of the present inventive method that reduces the local minimum problem affecting convergence during iterative inversion using a cross-correlation objective function.
Figure 5B:
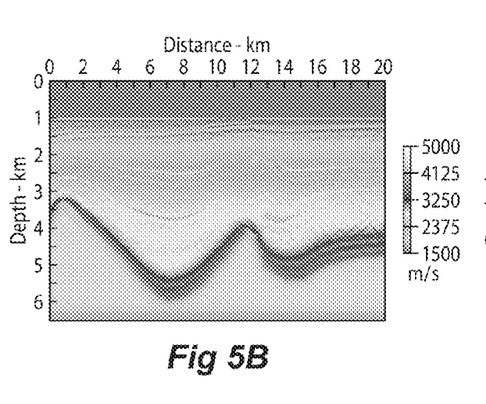
Figure 5C:
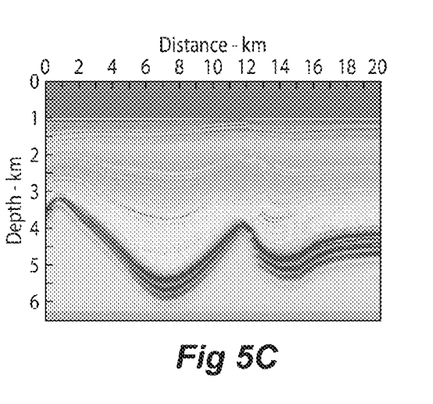

Feasibility of this approach is demonstrated with a synthetic example. There are 383 shots generated with 20 m shot spacing and receivers are placed every 10 m. To simulate the non-fixed receiver geometry, offsets from positive 200 m to 3 km are used for each shot. Those shots are encoded to form the measured encoded data. At each iteration in the nonlinear inversion, 8 simultaneous sources are used to compute the average gradient. FIG. 3 shows the sum of 4 shots that are closely spaced (here 20 m), whereas FIG. 4 shows the sum of 4 shots that are further apart (here 100 m). The basic idea is that increasing the separation of the shots reduces the crosstalk component in the objective function; however, too much separation leads to gaps in the data, which reduce the ability to update the model. As stated above, this situation may be alleviated by choosing several groups to form the encoded shots. Each group has well separated shots, but using several of these groups fills the spatial gaps that would otherwise remain if only one group is chosen. For the example presented here, 4 groups are chosen at each iteration and 2 realizations are used for each group, a realization being a simultaneous source simulation with a different set of encoding functions. So, in total, there are 8 encoded simultaneous shots per iteration. For comparison, an inversion was run with encoded shots that were closely spaced with 8 realizations per iterations. FIG. 5A is the true model used in this example. FIG. 5B shows the results from simultaneous source inversion when the sources are closely spaced. Due to presence of crosstalk in the model, the inversion could not find a suitable update beyond 50 iterations. The model at the $50^{th}$ iteration is plotted in FIG. 5B. For comparison, the model from the $50^{th}$ iteration when shots are well separated is plotted in FIG. 5C. There was no convergence problem during the inversion. There is much better agreement between FIGS. 5C and 5A than between FIGS. 5B and 5A.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model may either be downloaded, displayed, or saved to computer storage.

REFERENCES

1. Tarantola, A., "Inversion of seismic reflection data in the acoustic approximation," *Geophysics* 49, 1259-1266 (1984).
2. Sirgue, L., and Pratt G. "Efficient waveform inversion and imaging: A strategy for selecting temporal frequencies," *Geophysics* 69, 231-248 (2004).
3. Fallat, M. R., Dosso, S. E., "Geoacoustic inversion via local, global, and hybrid algorithms," *Journal of the Acoustical Society of America* 105, 3219-3230 (1999).
4. Hinkley, D. and Krebs, J., "Gradient computation for simultaneous source inversion," PCT Patent Application Publication No. WO 2009/117174.
5. Krebs, J. R., Anderson, J. A., Neelamani, R., Hinkley, D., Jing, C., Dickens, T., Krohn, C., Traynin, P., "Iterative inversion of data from simultaneous geophysical sources," PCT Patent Application Publication No. WO 2008/042081.
6. Van Manen, D. J., Robertsson, J. O. A., Curtis, A., "Making wave by time reversal," *SEG International Exposition and $75^{th}$ Annual Meeting Expanded Abstracts*, 1763-1766 (2005).
7. Berkhout, A. J., "Arcal shot record technology," *Journal of Seismic Exploration* 1, 251-264 (1992).
8. Zhang, Y., Sun, J., Notfors, C., Gray, S. H., Cherris, L., Young, J., "Delayed-shot 3D depth migration," *Geophysics* 70, E21-E28 (2005).
9. Van Riel, P., and Hendrik, W. J. D., "Method of estimating elastic and compositional parameters from seismic and echo-acoustic data," U.S. Pat. No. 6,876,928 (2005).
10. Mora, P., "Nonlinear two-dimensional elastic inversion of multi-offset seismic data," *Geophysics* 52, 1211-1228 (1987).
11. Ober, C. C., Romero, L. A., Ghiglia, D. C., "Method of Migrating Seismic Records," U.S. Pat. No. 6,021,094 (2000).
12. Ikelle, L. T., "Multi-shooting approach to seismic modeling and acquisition," U.S. Pat. No. 6,327,537 (2001).
13. Romero, L. A., Ghiglia, D. C., Ober, C. C., Morton, S. A., "Phase encoding of shot records in prestack migration," *Geophysics* 65, 426-436 (2000).

14. Jing X., Finn, C. J., Dickens, T. A., Willen, D. E., "Encoding multiple shot gathers in prestack migration," *SEG International Exposition and 70th Annual Meeting Expanded Abstracts,* 786-789 (2000).

15. Haber, E., Chung M. and Herrmann, "An effective method for parameter estimation with PDE constraints with multiple right hand sides," Preprint—UBC http://www.math.ubc.ca/~haber/pubs/PdeOptStochV5.pdf (2010).

16. Jerome R. Krebs, John E. Anderson, David Hinkley, Ramesh Neelamani, Sunwoong Lee, Anatoly Baumstein, and Martin-Daniel Lacasse, "Full-wavefield seismic inversion using encoded sources," *Geophysics* 74-6, WCC177-WCC188 (2009).

17. Boonyasiriwat, C., and Schuster, G., "3D Multisource full-waveform inversion using dynamic random phase encoding," *SEG Expanded Abstracts* 29, 1044-1049 (2010).

The invention claimed is:

1. A computer-implemented method for simultaneous encoded-source inversion of measured geophysical data, acquired under conditions where the fixed-receiver assumption of simultaneous encoded-source inversion is not valid, to determine a physical properties model for a subsurface region, comprising the following steps wherein all summing, simulating, computing, and updating are performed on a computer that is programmed to perform them:

(a) obtaining a group of two or more encoded gathers of the measured geophysical data acquired under conditions where the fixed-receiver assumption is not valid, wherein each gather is associated with a single generalized source, or alternatively with a single receiver, and wherein each gather is encoded with a different encoding function selected from a set of non-equivalent encoding functions;

(b) summing the encoded gathers in the group by summing all, or selected, data records in each gather that correspond to a single receiver or alternatively to a single source, and repeating for each different receiver or alternatively for each different source, resulting in a simultaneous encoded gather;

(c) assuming a physical properties model of the subsurface region, said model providing values of at least one physical property at locations throughout the subsurface region;

(d) simulating a synthetic simultaneous encoded gather of data, using the assumed physical properties model, wherein the simulation uses encoded source signatures, and wherein an entire simultaneous encoded gather is simulated in a single simulation operation;

(e) computing an objective function measuring cross-correlation between the simultaneous encoded gather of measured data and the simulated simultaneous encoded gather;

(f) updating the physical properties model by optimizing the objective function;

(g) iterating steps (a)-(f) at least one more time using the updated physical properties model from the previous iteration as the assumed physical properties model in step (c), resulting in a further updated physical properties model; and (h) downloading, displaying, or saving the further updated physical properties model to computer storage.

2. The method of claim 1, wherein the objective function is given by or is mathematically equivalent to:

$$\phi = \frac{d_{non\text{-}fixed}^{meas} \otimes d_{fixed}^{simulated}}{\|d_{non\text{-}fixed}^{meas}\| \|d_{fixed}^{simulated}\|}$$

where $d_{non\text{-}fixed}^{meas}$ are the simultaneous encoded gather of measured data, and $d_{fixed}^{simulated}$ are the simulated simultaneous encoded gather including simulated data traces for all receiver locations whether active or inactive during a particular shot, and $\|\ldots\|$ denotes a selected norm.

3. The method of claim 2, further comprising approximating the objective function by:

$$\phi \approx \frac{d_{non\text{-}fixed}^{simulated} \otimes d_{non\text{-}fixed}^{meas}}{\|d_{non\text{-}fixed}^{meas}\| \|d_{fixed}^{simulated}\|}$$

where $d_{non\text{-}fixed}^{simulated}$ are the simulated simultaneous encoded gather such that the traces corresponding to receivers that are inactive during a particular shot are substituted with zeros before encoding.

4. The method of claim 1, wherein the encoding function used on a gather in step (a) is changed in at least one of the iterations.

5. The method of claim 4, wherein two or more sets of encoding functions are used at each iteration and are designed to obtain an average gradient of the objective function.

6. The method of claim 1, wherein all encoding functions are changed in every iteration.

7. The method of claim 1, further comprising obtaining at least one additional group of two or more encoded gathers of the measured geophysical data as in step (a), and performing step (b) for each additional group, then accumulating the corresponding computed objective functions from step (e), wherein the updating of the physical properties model in step (f) is determined by maximizing the accumulated computed objective functions.

8. The method of claim 1, wherein said encoded gathers of measured data are encoded by temporally convolving all traces from the gather with the encoding function selected for the gather.

9. The method of claim 1, wherein the two or more encoded gathers of measured data are obtained by obtaining gathers of data from a geophysical survey in which data are acquired from a plurality of simultaneously operating, uniquely encoded source devices.

10. The method of claim 1, wherein the measured geophysical data are from a seismic survey of the subsurface region.

11. The method of claim 10, wherein the generalized seismic sources are either all point sources or all plane-wave sources.

12. The method of claim 1, wherein the encoded source signatures used in the synthetic simultaneous encoded gather simulation either use the same encoding functions used to encode the simultaneous encoded gather of measured data or are functions made by temporally convolving measured or estimated source signatures with the same encoding functions used to encode the corresponding measured gather in step (a), wherein the measured geophysical data include measured or estimated source signatures of each source activation.

13. The method of claim 8, wherein the encoding functions are of a type selected from a group consisting of linear, random phase, chirp, modified chirp, random time shift, and frequency independent phase encoding.

14. The method of claim 8, wherein the encoding functions are of one type for some sources and of another type for other sources.

15. The method of claim 1, wherein the encoding functions are optimized to improve quality of the objective function.

16. The method of claim 1, wherein the simulating in step (d) is performed with a finite difference, finite element or finite volume simulation code.

17. The method of claim 10, wherein the physical property model is a model of seismic wave velocity, seismic elastic parameters, seismic anisotropy parameters or seismic anelasticity parameters.

18. The method of claim 1, wherein a global objective function optimization method selected from a group consisting of Monte Carlo, simulated annealing, genetic or evolution algorithm is used to update the model.

19. The method of claim 1, wherein a local objective function optimization method selected from a group consisting of gradient line search, conjugate gradients or Newton's method is used to update the model.

20. The method of claim 1, wherein maximizing the objective function comprises computing a gradient of the objective function with respect to parameters of the physical properties model.

21. A computer-implemented method for simultaneous encoded-source inversion of measured geophysical data, acquired under conditions where the fixed-receiver assumption of simultaneous encoded-source inversion is not valid, to determine a physical properties model for a subsurface region, comprising:
(a) obtaining measured geophysical data from a geophysical survey of the subsurface region in which the fixed-receiver assumption was not valid;
(b) using a programmed computer to invert the measured data by iterative inversion comprising using an assumed or updated physical properties model to simultaneously simulate survey data representing a plurality of survey sources, or alternatively a plurality of receivers, wherein source or receiver signatures in the simulation are encoded, resulting in a simulated simultaneous encoded gather of geophysical data, the inversion further comprising determining a model update for a next iteration by optimizing an objective function measuring cross-correlation between the simulated simultaneous encoded gather and a corresponding simultaneously encoded gather of the measured geophysical data; and
(c) downloading or displaying an updated physical properties model or saving it to computer memory or data storage.

22. The method of claim 21, wherein some or all of the geophysical data are partitioned into a plurality of data groups in a way that increases separation between source activation locations within each data group as compared to the some or all of the geophysical data before partitioning, and the simulated simultaneous encoded gather for each iteration corresponds to a different data group with all groups being used in the course of the iterations.

23. A computer program product, comprising a non-transitory computer usable medium having a computer readable program code embodied therein, said computer readable program code adapted to be executed to implement a method for simultaneous encoded-source inversion of measured geophysical data, acquired under conditions where the fixed-receiver assumption of simultaneous encoded-source inversion is not valid, to determine a physical properties model for a subsurface region, said method comprising:
(a) inputting a group of two or more encoded gathers of the measured geophysical data, wherein each gather is associated with a single generalized source, or alternatively with a single receiver, and wherein each gather is encoded with a different encoding function selected from a set of non-equivalent encoding functions;
(b) summing the encoded gathers in the group by summing all data records in each gather that correspond to a single receiver or alternatively to a single source, and repeating for each different receiver or alternatively for each different source, resulting in a simultaneous encoded gather;
(c) inputting a physical properties model of the subsurface region, said model providing values of at least one physical property at locations throughout the subsurface region;
(d) simulating a synthetic simultaneous encoded gather of data, using the assumed physical properties model, wherein the simulation uses encoded source signatures, and wherein an entire simultaneous encoded gather is simulated in a single simulation operation;
(e) computing an objective function measuring cross-correlation between between the simultaneous encoded gather of measured data and the simulated simultaneous encoded gather;
(f) updating the physical properties model by optimizing the objective function; and
(g) iterating steps (a)-(f) at least one more time using the updated physical properties model from the previous iteration as the assumed physical properties model in step (c), resulting in a further updated physical properties model.

24. A method for producing hydrocarbons from a subsurface region, comprising:
(a) performing a seismic survey of the subsurface region, wherein the fixed-receiver assumption of simultaneous encoded-source inversion is not satisfied;
(b) obtaining a velocity model of the subsurface region determined by a method comprising:
inverting the survey's measured data by iterative inversion comprising using an assumed or updated velocity model to simultaneously simulate survey data representing a plurality of survey sources, or alternatively a plurality of receivers, wherein source or receiver signatures in the simulation are encoded, resulting in a simulated simultaneous encoded gather of geophysical data, the inversion further comprising determining a velocity model update for a next iteration by optimizing an objective function measuring cross-correlation between the simulated simultaneous encoded gather and a corresponding simultaneously encoded gather of the measured data;
(c) drilling a well into a layer in the subsurface region identified at least partly from an interpretation of structure in the subsurface region made using an updated velocity model from (b); and
(d) producing hydrocarbons from the well.

25. The method of claim 1, wherein the encoding is performed by multiplying each gather and each source signature by a selected encoding function, and wherein in each iteration of step (g) one or more encoding functions are set equal to zero such that the data records not zeroed correspond to source activation locations that are more separated, on average, than in the measured geophysical data before encoding, with all data records being used, i.e. not being zeroed, as the iterations progress.

26. The method of claim 25, wherein the encoding functions are used to randomly choose the shots in each iteration that will result in increased shot spacing.

27. The method of claim 1, wherein the measured geophysical data being inverted are full-wavefield seismic data.

* * * * *